UNITED STATES PATENT OFFICE.

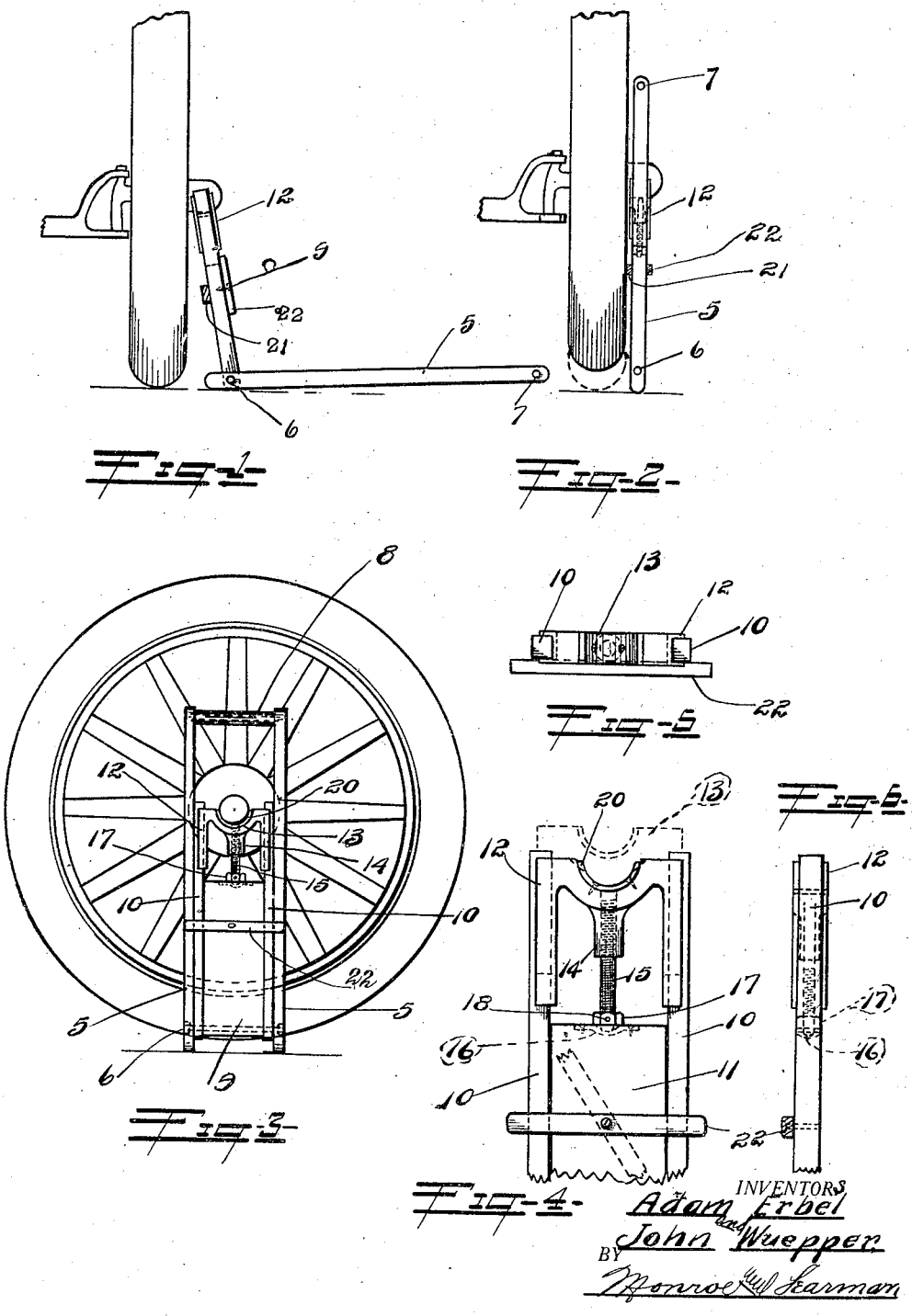

ADAM ERBEL AND JOHN WUEPPER, OF BAY CITY, MICHIGAN.

AUTOMOBILE-WHEEL JACK.

1,335,885. Specification of Letters Patent. Patented Apr. 6, 1920.

Application filed July 17, 1919. Serial No. 311,653.

*To all whom it may concern:*

Be it known that we, ADAM ERBEL and JOHN WUEPPER, citizens of the United States of America, residing at Bay City, in the county of Bay and State of Michigan, have invented certain new and useful Improvements in Automobile-Wheel Jacks, of which the following is a specification.

This invention relates to automobile wheel jacks and the like.

One object of the invention is to provide a simple, inexpensive and durable jack for supporting the wheels of the automobile when the machine is in the garage and not in use, so that the tires thereof will be clear of the floor and relieved of the weight of the machine, thereby lengthening the life of the said tires.

Another object is to provide means whereby the jack can be adjusted so that the machine can be raised a height sufficient to allow the tires thereof to barely clear the floor, or be raised a number of inches when the machine is to be idle for a long period of time.

A further object is to provide a detachable leather or rubber lining so that the hub of the machine will not be marred by the jack when it is being raised.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details without departing from the spirit or sacrificing any of the advantages of the invention.

In the drawings:—

Figure 1 is a front view of an automobile wheel showing our improved jack in position for raising the wheel.

Fig. 2 is a similar view showing the wheel raised and the jack in position thereon.

Fig. 3 is a side view also showing the wheel in the raised position.

Fig. 4 is an enlarged fragmentary view of the adjusting mechanism.

Fig. 5 is a top plan view thereof, and

Fig. 6 is a side view of the same.

Referring now more particularly to the drawings in which the preferred embodiment of our invention is shown, the jack comprises a pair of spaced apart parallel lifting bars 5 connected near their lower extremities by the bolt member 6 spaced from the ends thereof, and at their upper ends by a similar bolt member 7 on which the handle 8 is mounted, all of which is combined to form a frame, and to perform the functions of a lifting lever, and while I have shown these side bars as being constructed of wood, it will be readily understood that any other suitable material can be used.

Located between the side bars 5 and pivotally mounted on the bolt member 6 is the thrust member 9, which is in this instance made up of three pieces rigidly secured together, the two side pieces 10 extending beyond the member 11 and forming a track or guide for the sides 12 of the yoke member 13 in which the hub of the machine is designed to be seated, the sides 12 being U-shaped and adapted to slide up or down on the members 10.

Extending downwardly from the yoke member 13 is the hub portion 14 which is threaded to receive the bolt member 15, the end of the said bolt member being seated in a small casting 16 secured to the member 11 and forming a bearing for the bolt 15, a clamping nut 17 being threaded on the bolt and pinned thereto by means of the pin 18, and it will be apparent that when the nut 17 is turned, and with it the bolt member 15, it will gradually force the yoke 13 up or down as the case may be, thereby raising or lowering the hub of the machine as desired, and it will be entirely independent of the initial rise occasioned when the jack is placed in position and the wheel raised, and it will be obvious that the wheel can be adjusted to any desired reasonable height.

In order that the yoke, which is preferably made of metal, may not mar the hub of the machine, the hub seat is lined with a leather or rubber 20 which can be detachably secured in place by use of small screws or the like, and when worn or torn can be readily removed and replaced.

When the jacks are in position on the machine the bearing surface is naturally limited, and to prevent swaying or swinging, a cross member 21 is provided and is rigidly secured to the thrust member 9, and when the jacks are placed in the position as shown in Fig. 1 and the wheel is raised to the position as shown in Figs. 2 and 3, the lifting lever will butt against the ends of this cross member 21 and will prevent the upper end thereof from swinging further inwardly, and to prevent its swinging outwardly a button 22 is pivoted to the opposite side of this member 9, and when the jack is in the position as shown in Fig. 1 this button will assume the position as shown in dotted lines in Fig. 4, but when the jack is in position on the wheel this button will be turned to the horizontal position as shown in the full lines, the ends thereof extending beyond the member 9 and resting against the members 5, and it will be obvious that the jack will be locked in this position.

Ordinarily when the machine is in continual use, it is merely necessary to raise the wheels so that they barely clear the floor, but when the machine is laid up for a long period of time, it is very desirable that the jack be adjustable to allow the wheels to be raised to a greater height from the floor, and this is what we claim to have accomplished in our present invention.

By reference to the foregoing description it will be obvious that we have perfected a simple and inexpensive adjustable jack which is very efficient and easy to operate.

What we claim is:

1. An automobile jack comprising a lifting lever having a thrust lever pivoted thereto, a hub seat adjustably mounted on the thrust lever and means for adjusting the said seat, a cross member rigidly secured to the thrust member and extending beyond the edges thereof, and a button pivotally mounted on the opposite side of the thrust lever for locking the same when the wheel is raised.

2. An automobile jack comprising a lifting lever having spaced side bars, a handle connecting the said bars, a thrust lever pivoted to the side bars and spaced from the ends thereof, a hub seat adjustably mounted on the thrust lever and means for adjusting the same, a stop rigidly secured to one side of the thrust lever and extending beyond the edges thereof, and a button pivoted to the opposite side of the said lever for locking the same in position when the wheel is raised.

3. In a jack comprising a lifting lever having spaced parallel side bars, a handle connecting the said bars, a thrust lever pivotally mounted between the said bars, a hub seat adjustably mounted on the thrust lever and provided with substantially U-shaped edges for slidably engaging the edges of the thrust lever, and means for adjusting the said hub seat on the thrust lever.

4. An automobile jack comprising a lifting lever having spaced parallel side bars, a handle connecting the said bars, a thrust lever pivotally mounted between the said bars and upstanding guides integral therewith, a hub seat adjustably mounted on the thrust lever and having substantially U-shaped edges slidably engaging the said guides, a central threaded opening in the hub seat, a threaded member on the thrust member and engaging the threaded opening for raising and lowering the said hub seat.

5. An automobile jack comprising a lifting lever having spaced parallel side bars, a handle connecting the upper end of the said bars and a thrust lever pivoted between the same and provided with upwardly extending edges, a hub seat mounted on the thrust lever between the said edges and provided with substantially U-shaped edges for slidably engaging the said upwardly extending edges, a central downwardly projecting hub integral with the said hub seat and a threaded opening therein, a bolt member mounted on the thrust lever and adapted to be threaded into the said opening, and means secured to the bolt member for revolving same to raise or lower the said hub seat.

In testimony whereof we affix our signatures.

ADAM ERBEL,
JOHN WUEPPER.